Figure 8:
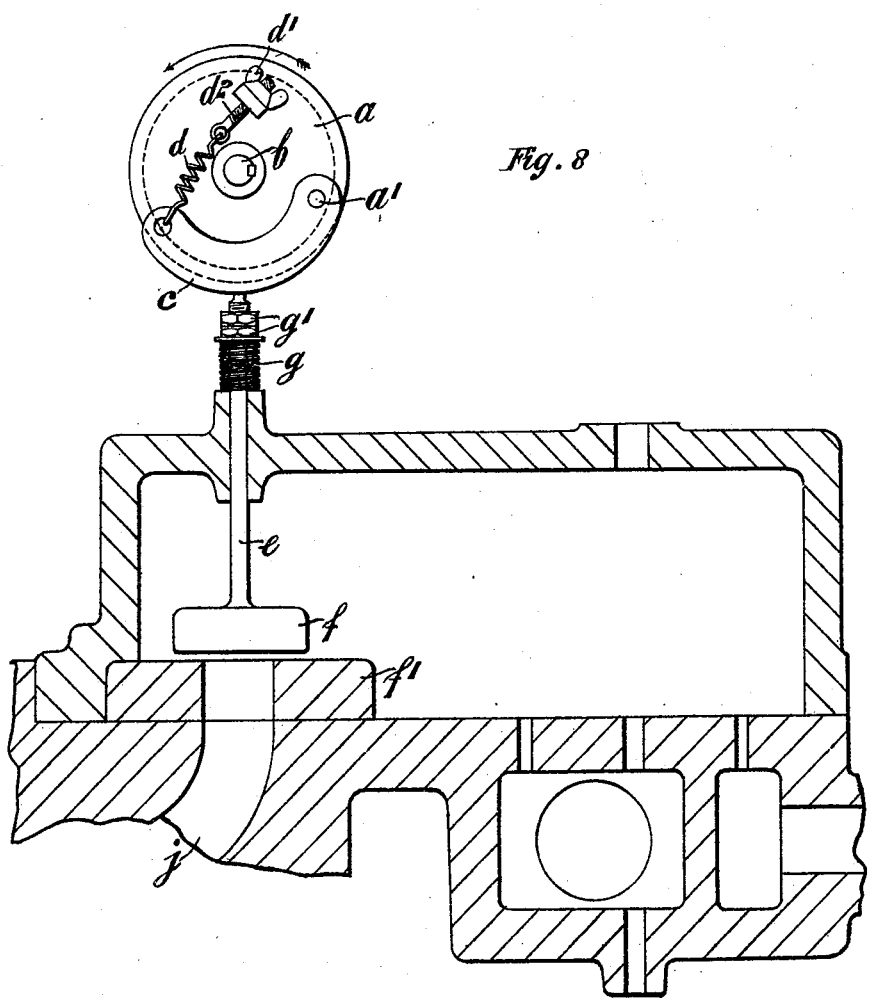

(No Model.) 6 Sheets—Sheet 1.
R. CALDWELL.
GAS ENGINE GOVERNOR.
No. 589,335. Patented Aug. 31, 1897.
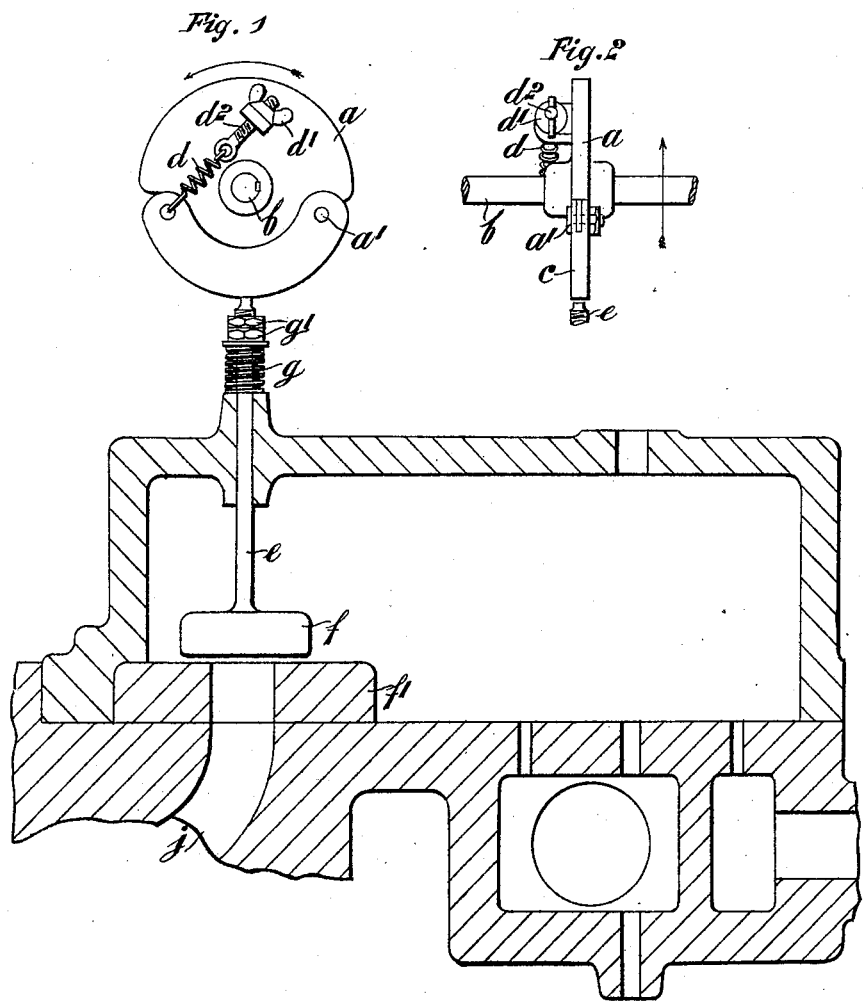

(No Model.)
6 Sheets—Sheet 2.
R. CALDWELL.
GAS ENGINE GOVERNOR.
No. 589,335. Patented Aug. 31, 1897.
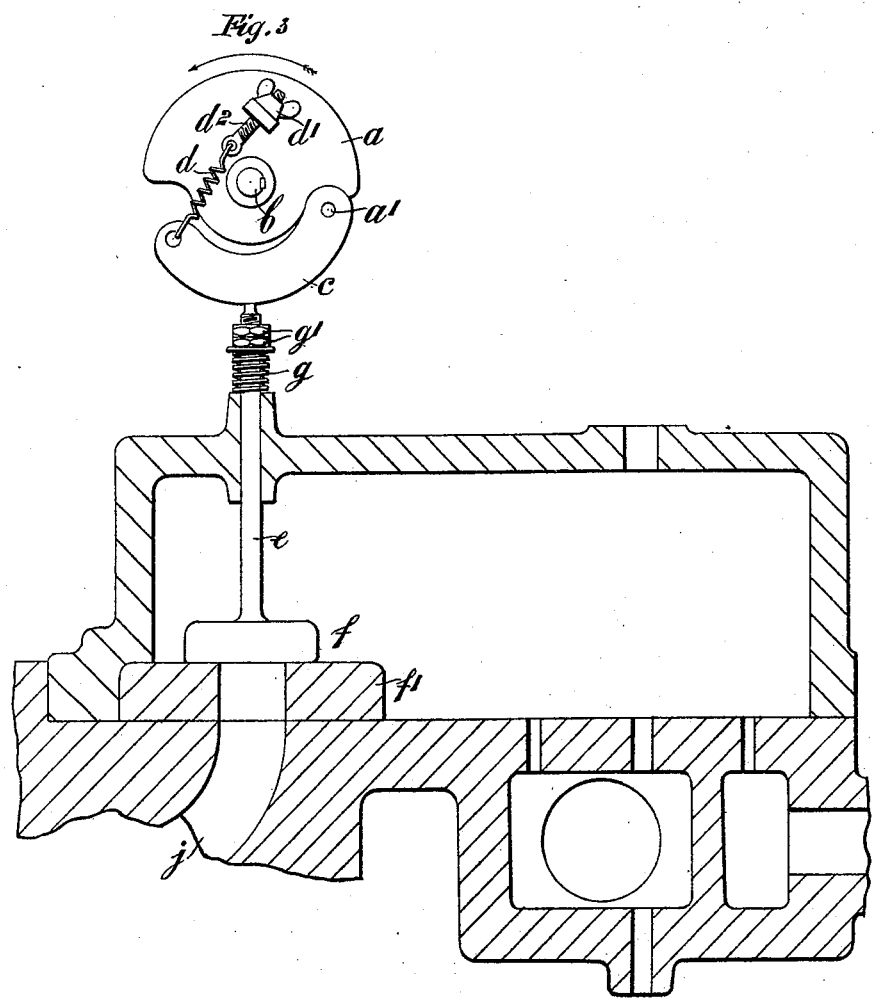
Witnesses
H. van Oldenneel
E. A. Scott
Inventor
Robert Caldwell
by Richardson
Atty (No Model.)  6 Sheets—Sheet 3.
R. CALDWELL.
GAS ENGINE GOVERNOR.
No. 589,335. Patented Aug. 31, 1897.
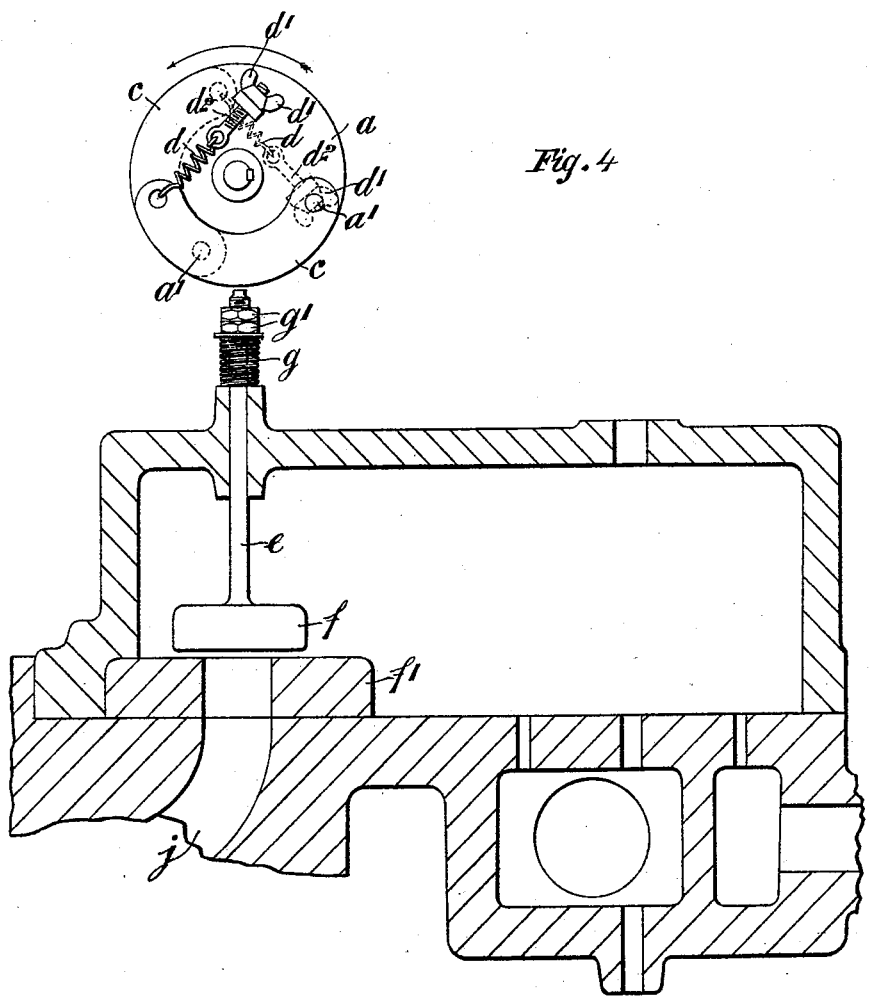

(No Model.) 6 Sheets—Sheet 4.
R. CALDWELL.
GAS ENGINE GOVERNOR.
No. 589,335. Patented Aug. 31, 1897.
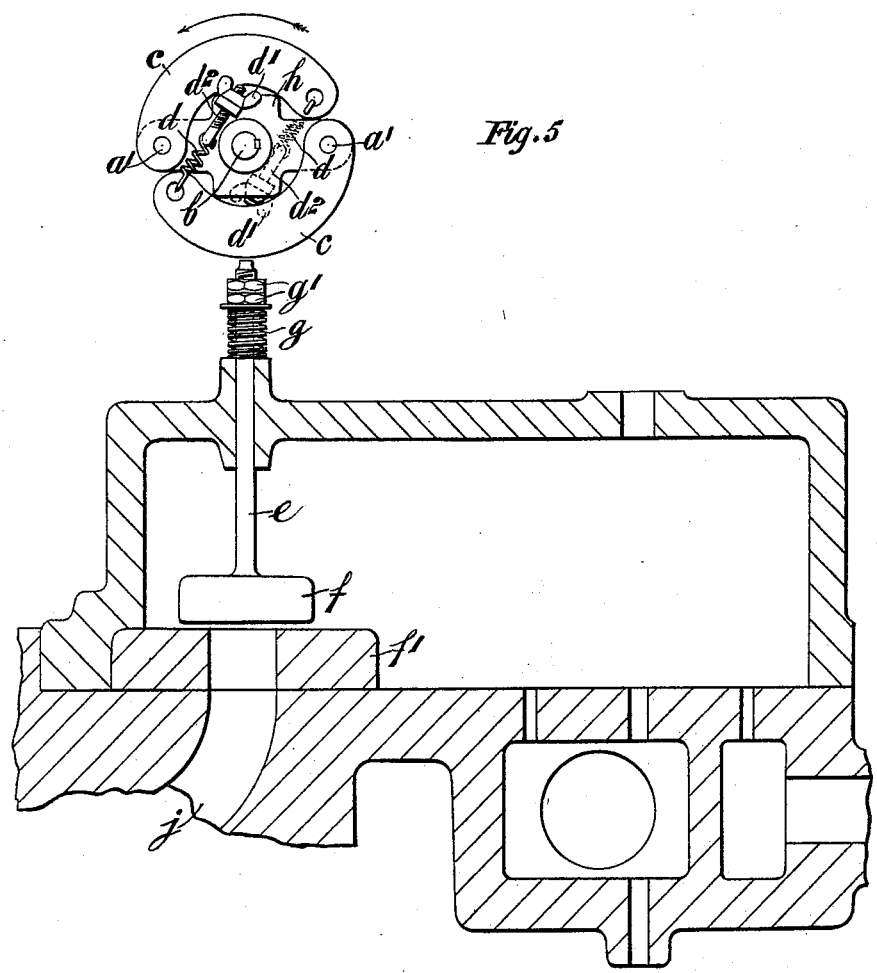
Witnesses
H. van Oldenneel
E. A. Scott
Inventor
Robert Caldwell
by Richardson
Attys (No Model.) 6 Sheets—Sheet 5.
R. CALDWELL.
GAS ENGINE GOVERNOR.
No. 589,335. Patented Aug. 31, 1897.
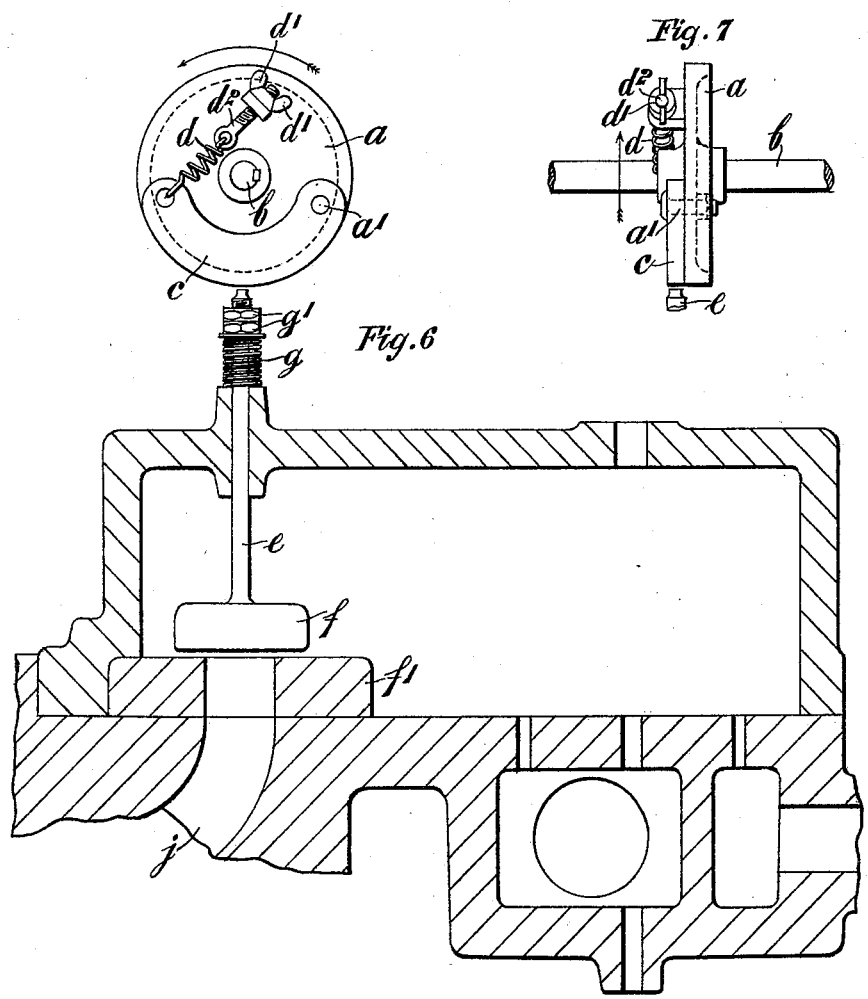
Witnesses
H. van Oldemneel
E. A. Scott
Inventor
Robert Caldwell
by Richardson
Attys (No Model.)  6 Sheets—Sheet 6.

R. CALDWELL.
GAS ENGINE GOVERNOR.

No. 589,335.  Patented Aug. 31, 1897.

Witnesses
H. van Oldenneel
E. A. Scott

Inventor
Robert Caldwell
by Richardson
Attys

UNITED STATES PATENT OFFICE.

ROBERT CALDWELL, OF AUCKLAND, NEW ZEALAND.

GAS-ENGINE GOVERNOR.

SPECIFICATION forming part of Letters Patent No. 589,335, dated August 31, 1897.

Application filed October 30, 1896. Serial No. 610,566. (No model.)

*To all whom it may concern:*

Be it known that I, ROBERT CALDWELL, mechanic, of Wellesley Street, Auckland, in the Colony of New Zealand, have invented an Improved Governor Especially Applicable to Gas-Engines and the Like, of which the following is a specification.

The object of my invention is to provide a governor which shall overcome the difficulties and inconveniences experienced by the governors at present in use, more particularly upon gas-engines and the like, and one which shall be more regular and certain in its action in governing the engine.

I carry out the object of my invention by a governor of simple construction, consisting in one form of a disk provided with an arm, which arm at slow speeds or when the engine is at rest is held in position by a spring, but at speeds greater than required the resistance of the spring is overcome by centrifugal force and the arm projects beyond the periphery of the disk. When in the latter position, the arm will touch the spindle of the valve at each revolution, keeping it closed for a longer or shorter length of time, according to the distance the arm is advanced by the speed of the engine.

In slow speeds or when the engine is at rest the valve is kept open by a spring, and the regulation of the admission of explosive mixture to the cylinder is effected by closing or partially closing the same, as just mentioned.

In order that my invention may be most easily understood, I will now describe the same in detail, and in doing so shall refer to the accompanying drawings, whereon similar letters of reference indicate similar parts throughout the views.

Figure 1 is a front view of my governor and valve adapted to the mixing-chamber of an ordinary gas-engine and showing the arm closed and the valve open. Fig. 2 is a side view of the same, the chamber being omitted. Fig. 3 is a front view of the same, showing the arm projecting and the valve closed. Fig. 4 is a front view of a governor provided with two arms. Fig. 5 is a front view of another form of governor with two arms. Fig. 6 is a front view of another form of governor with the arm on the side of the disk and the valve open. Fig. 7 is a side view of the same, the chamber being omitted. Fig. 8 is a front view of the same, showing the arm projecting and the valve closed.

Referring to the drawings, $a$ is the disk mounted upon the shaft $b$, which is geared or otherwise connected to the crank-shaft of the engine and by which it is revolved. An arm $c$ is pivoted to the disk $a$ at $a'$ and is held at slow speeds in the position shown in Fig. 1 and by spring $d$. The tension of this spring $d$ may be regulated by nut $d'$ and screwed stud $d^2$. At high speeds arm $c$ will assume a position varying more or less from that shown in Fig. 1 to that shown in Fig. 3, in which latter case it has been thrown outward by centrifugal force until it has touched and depressed spindle $e$ of valve $f$ until the latter is closed upon its seat $f'$. Immediately the speed is decreased and the arm $c$ recedes the valve $f$ is again opened by spring $g$, which will raise the valve to admit a fresh supply of explosive mixture to the cylinder. The tension of spring $g$ may be regulated as required by nuts $g'$.

In cases where it is desired to keep the valve closed for a greater length of time during each revolution of the governor I provide two arms arranged as shown in Fig. 4, and in Fig. 5 I have shown another form where the disk is replaced by a central piece $h$.

It will thus be seen that my governor operates by allowing the admission-valve to remain open during slow speeds or when the engine is at rest, but at higher speeds the spindle $e$ and valve $f$ are continually depressed to a greater or less distance to regulate the admission of explosive mixture to orifice $j$ and the cylinder of the engine.

It will be obvious that my invention admits of modifications by a skilled person—as, for example, spring $d$ may be dispensed with and the arm $c$ made in the form of a spring fixed upon the periphery of the disk $a$ instead of pivoted, as at $a'$—and in other ways my invention may be modified without departing from the spirit of the same.

It will be evident that as the normal position of the admission-valve admits of a free passage for the gas or other motive fluid a stop-valve must be provided to shut off the same when the engine is at rest.

Having now particularly described and ascertained the nature of my said invention and in what manner the same is to be performed, I declare that what I claim is—

In combination, in a gas-engine, the inlet-valve and a governor comprising a rotary disk having a centrifugal part carried thereby bearing directly on the valve-stem, substantially as described.

ROBERT CALDWELL.

Witnesses:
J. I. MACKY,
STOCHAM MARKY.